US010353492B2

(12) United States Patent
Chan et al.

(10) Patent No.: US 10,353,492 B2
(45) Date of Patent: Jul. 16, 2019

(54) MOBILE CLIENT DEVICE WIRELESS CHARGING, COMMUNICATION, AND AUTHENTICATION TECHNIQUES

(71) Applicant: Microsoft Technology Licensing, LLC, Redmond, WA (US)

(72) Inventors: Adrian Shuen-yung Chan, Shenzhen (CN); Jack Li, Shenzhen (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/936,145

(22) Filed: Nov. 9, 2015

(65) Prior Publication Data
US 2016/0320867 A1 Nov. 3, 2016

(30) Foreign Application Priority Data

Apr. 30, 2015 (CN) .......................... 2015 1 0215928

(51) Int. Cl.
*G06F 3/0354* (2013.01)
*H04B 5/00* (2006.01)
(Continued)

(52) U.S. Cl.
CPC ........ *G06F 3/03543* (2013.01); *G06F 1/1632* (2013.01); *G06F 1/263* (2013.01); *G06F 1/266* (2013.01); *G06F 3/038* (2013.01); *H02J 7/0044* (2013.01); *H02J 7/0054* (2013.01); *H02J 7/025* (2013.01); *H02J 50/10* (2016.02); *H04B 5/0037* (2013.01); *H02J 2007/0062* (2013.01)

(58) Field of Classification Search
CPC ...... G06F 3/03543; G06F 3/038; H02J 50/10; H02J 7/0044; H02J 7/025; H04B 5/0037
See application file for complete search history.

(56) References Cited

U.S. PATENT DOCUMENTS 5,933,496 A * 8/1999 McKinnon .......... H01M 2/1022
320/110
7,164,255 B2 1/2007 Hui
(Continued)

OTHER PUBLICATIONS

"Genius Energy Mouse Review" by John Burek, published Feb. 6, 2014.*

(Continued)

*Primary Examiner* — Patrick N Edouard
*Assistant Examiner* — Peijie Shen
(74) *Attorney, Agent, or Firm* — NovoTechIP International PLLC

(57) ABSTRACT

Mobile client device wireless charging, communication, and authentication techniques are described. In one or more implementations, a cursor control device includes an external housing configured to be grasped by a hand of a user and an input device module disposed within the housing configured to control movement of a cursor of a computing device that is communicatively coupled to the input device module. The cursor control device also includes one or more buttons accessible via the external housing that are configured to support user interaction to provide inputs to the computing device, a battery disposed within the external housing, and a power port disposed on the external housing and configured to charge an external device using power obtained from the battery disposed within the housing.

18 Claims, 6 Drawing Sheets

(51) Int. Cl.
*H02J 50/10* (2016.01)
*H02J 7/00* (2006.01)
*G06F 3/038* (2013.01)
*H02J 7/02* (2016.01)
*G06F 1/16* (2006.01)
*G06F 1/26* (2006.01)

(56) References Cited

U.S. PATENT DOCUMENTS

| | | | |
|---|---|---|---|
| 7,948,208 B2 | 5/2011 | Partovi et al. | |
| 8,041,389 B2 | 10/2011 | Combs et al. | |
| 8,612,641 B1 | 12/2013 | Bozarth et al. | |
| 8,903,456 B2 | 12/2014 | Chu et al. | |
| 2006/0031769 A1 | 2/2006 | Eizips | |
| 2007/0133238 A1* | 6/2007 | Herbold | H04L 12/10 363/63 |
| 2007/0152967 A1* | 7/2007 | Ping | G06F 3/03543 345/163 |
| 2008/0096551 A1 | 4/2008 | Huang | |
| 2008/0316177 A1* | 12/2008 | Tseng | G06F 3/03543 345/168 |
| 2009/0035608 A1* | 2/2009 | Campesi | H01M 2/1027 429/7 |
| 2010/0127660 A1 | 5/2010 | Cook et al. | |
| 2010/0270969 A1* | 10/2010 | Sip | H02J 7/025 320/108 |
| 2011/0136550 A1 | 6/2011 | Maugars | |
| 2011/0175567 A1 | 7/2011 | Kidakarn | |
| 2011/0314153 A1 | 12/2011 | Bathiche et al. | |
| 2012/0052923 A1 | 3/2012 | Park | |
| 2012/0115549 A1* | 5/2012 | Kim | H02J 7/0047 455/566 |
| 2014/0018127 A1 | 1/2014 | Meiri et al. | |
| 2014/0059263 A1 | 2/2014 | Rosenberg et al. | |
| 2014/0199971 A1* | 7/2014 | Totzke | H04W 4/008 455/411 |
| 2014/0295758 A1* | 10/2014 | Pedersen | G06F 1/1632 455/41.2 |
| 2015/0015180 A1* | 1/2015 | Miller | H02J 7/025 320/103 |
| 2015/0048687 A1* | 2/2015 | Wang | H01F 38/14 307/104 |

OTHER PUBLICATIONS

"Philips Research Technologies—Wireless Charging for Mobile Devices", Retrieved From: <http://www.research.philips.com/technologies/wireless-charging.html> Mar. 20, 2015, Jun. 17, 2008, 2 pages.

"Mobee Magic Charger for Apple Magic Mouse", Retrieved From: <http://store.apple.com/uk/product/H4825ZM/B/mobee-magic-charger-for-apple-magic-mouse> Mar. 20, 2015, 2011, 4 pages.

"First Office Action Issued in Chinese Patent Application No. 201510215928.6", dated Jul. 12, 2018, 11 Pages.

\* cited by examiner

MOBILE CLIENT DEVICE WIRELESS CHARGING, COMMUNICATION, AND AUTHENTICATION TECHNIQUES

RELATED APPLICATIONS

This application claims benefit of priority of China Patent Application Serial No. 201510215928.6 entitled "Mobile Client Device Wireless Charging, Communication, and Authentication Techniques" filed Apr. 30, 2015, the content of which is incorporated by reference herein in its entirety.

BACKGROUND

Users have access to an ever increasing variety of portable devices that the users interact with on any given day. For example, users may carry a mobile phone and tablet, a portable music player, wearable devices (e.g., a watch, band, or other wearable), and so on. Further, these devices may include additional peripheral devices used to expand the functionality of the devices, such as powered noise cancelling headphones, an active stylus, cursor control devices (e.g., a mouse or trackpad), dedicated game controllers, and so forth.

This multitude of devices and the requirement of charging the batteries of each of the devices may quickly become frustrating to a user. This frustration may be exacerbated by proprietary chargers, or even different types of non-propriety chargers, e.g., mini USB and USB Type-C. Accordingly, a user may carry fewer devices, even though the user may benefit from the added functionality provided by the additional devices.

SUMMARY

Mobile client device wireless charging, communication, and authentication techniques are described. In one or more implementations, a cursor control device includes an external housing configured to be grasped by a hand of a user and an input device module disposed within the housing configured to control movement of a cursor of a computing device that is communicatively coupled to the input device module. The cursor control device also includes one or more buttons accessible via the external housing that are configured to support user interaction to provide inputs to the computing device, a battery disposed within the external housing, and a power port disposed on the external housing and configured to charge external device using power obtained from the battery disposed within the housing.

In one or more implementations, an apparatus includes a substrate, at least one cable configured to obtain power from an external power source, and an electromagnetic inductive coil formed integrally as part of the substrate. The electromagnetic inductive coil is configured to form a wireless coupling with external device suitable to communicate with the external device and to charge a battery of the external device using the power obtained from the external power source.

In one or more implementations, a method includes detecting by a wireless charging mat that a mobile client device has been placed at a distance proximal to a charging and communication coil of the wireless charging mat to achieve a communicative connection. The method also includes obtaining one or more credentials by the wireless charging mat from the mobile client device that are usable to authenticate the mobile client device and responsive to the obtaining, transferring the one or more credentials by the wireless charging mat to a computing device such that the computing device is configured to authenticate the mobile client device for operation with the computing device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
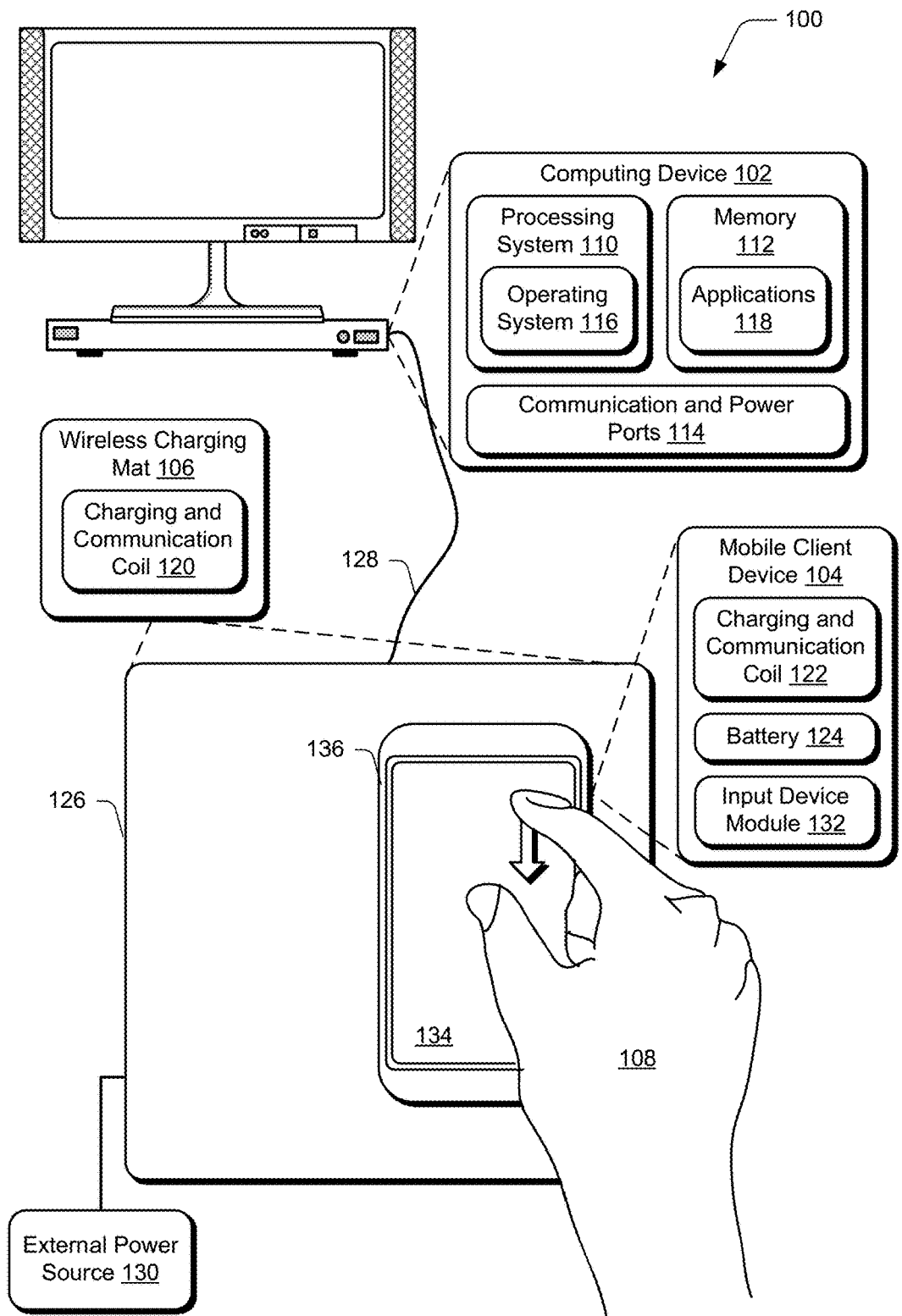
FIG. 1 is an illustration of an environment in an example implementation that is operable to perform mobile client device wireless charging, communication, and authentication techniques.

The number of mobile devices that a user interacts with continues to increase, thereby increasing the amount of management a user performs in order to keep these devices charged. Consequently, combining functionality provided by disparate devices may have a significant improvement in a user's experience with the devices.

Accordingly, mobile client device wireless charging, communication, and authentication techniques are described. In a first such example, techniques are configured to support wireless charging of a mobile client device (e.g., mobile phone) of a user. A wireless charging mat, for instance, is configured with a charging and communication coil that supports electromagnetic inductive charging of the mobile client device, e.g., to charge a battery of the device. In instances where the mobile client device does not include a complementary charging and communication coil itself, a mobile client device cradle may be used.

Through support of wireless communication via the coil, a variety of other functionalities may also be supported. In a first instance, the mobile client device may act as a cursor control device, e.g., through use of the display device of the mobile client device as a trackpad or through tracking of two dimensional movement of the device as a whole in relation to a surface. In this way, the number of discrete devices (each with its own battery) managed by a user may be reduced, thereby improving a user's experience. Direct communication techniques between the mobile client device and the computing device (e.g., without using the wireless charging mat as an intermediary) are also contemplated.

In another instance, the communication techniques are used to support authentication. Authentication may be used to login a user for access to a computing device, gain permission to receive power by the device from the wireless charging mat, and so forth. Other communication techniques are also contemplated without departing from the spirit and scope thereof.

Further techniques are described in which a cursor control device is configured to operate as an external power source usable to charge external devices. For example, hardware components used to implement the input device functionality, e.g., to detect lateral movements, "clicks," and so forth generally involve a relatively small amount of hardware. However, the cursor control device also generally employs a large external housing such that the device may be readily grasped and controlled by a user's hand, which results in a significant amount of extra space.

In this example, this extra space within this external housing is leveraged to include a battery having a size that is sufficient to charge external devices, such as via an external power port disposed on the housing of the cursor control device. In this way, functionality to control a cursor of a computing device is combined with an ability to charge external devices, thereby permitting the user to forgo use of dedicated external power packs. Further discussion of these and other techniques is described in the following sections and shown in corresponding figures.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ the techniques described herein. The illustrated environment 100 includes a computing device 102, a mobile client device 104, and a wireless charging mat 106.

Computing devices that implement computing device 102 and the mobile client device 104 are configurable in a variety of ways. For example, a computing device may be configured as a computer that is capable of communicating over a network, such as a desktop computer, a mobile station, an entertainment appliance, a set-top box communicatively coupled to a display device, a wireless phone, a game console, and so forth. For a mobile client device 104, mobile configurations suitable to be held by one or more hands of a user are contemplated, such as mobile phones, tablets, portable game devices, portable music devices, and so on. Thus, the computing device 102 may range from full resource devices with substantial memory and processor resources (e.g., personal computers, game consoles) to a low-resource device with limited memory and/or processing resources (e.g., traditional set-top boxes, hand-held game consoles). Additionally, although a single computing device 102 is shown in some instances, the computing device 102 may be representative of a plurality of different devices, such as multiple servers utilized by a business to perform operations such as a web service, a remote control and set-top box combination, an image capture device and a game console configured to capture gestures, and so on.

The computing device 102 is illustrated as including a variety of hardware components, including a processing system 110, an example of a computer-readable storage medium illustrated as memory 112, communication and power ports 114, and so on. The processing system 110 is representative of functionality to perform operations through execution of instructions stored in the memory 112. Although illustrated separately, functionality of these components may be further divided, combined (e.g., on an application specific integrated circuit), and so forth.

The computing device 102 is further illustrated as including an operating system 116. The operating system 116 is configured to abstract underlying functionality of the computing device 102 to applications 118 that are executable on the computing device 102. For example, the operating system 116 may abstract processing system 110, memory 112, communication and power ports 114, and other functionality of the computing device 102 such that the applications 118 may be written without knowing "how" this underlying functionality is implemented. The application 118, for instance, may receive inputs via the operating system 116, such as from input devices communicatively coupled to the communication and power ports 114 without understanding "where" the inputs originated or "how" the inputs are detected. The operating system 116 may also represent a variety of other functionalities, such as managing a file system and user interface that is navigable by a user of the computing device 102.

The communication and power ports 114 are configurable in a variety of ways to support communication with external devices and may even provide power to the external devices, e.g., to charge the devices. Examples of such configurations include USB ports (e.g., versions 1, 2, 3 and connector types such as mini, Types "A," "C," and so forth), Thunderbolt®, Lightning®, and other types of configurations that support communication of data and/or power in an amount sufficient to charge a device.

The wireless charging mat 106 and the mobile client device 104 are each illustrated as including respective charging and communication coils 120, 122. The charging and communication coils 120, 122 are representative of functionality to wirelessly transfer power and/or communicate over a wireless connection using electromagnet induction. The coils form an electrical transformer, such that the charging and communication coil 120 of the wireless charging mat 106 creates an alternating electromagnetic field that is transformed by the charging and communication coil 122 of the mobile client device 104 back into an electrical current, e.g., to power and/or charge the battery 124 of the mobile client device 104.

The charging and communication coil 120 of the wireless charging mat 106 is formed as part of a substrate 126, such as a plastic or rubber like material. Power supplied to the charging and communication coil 120 may originate from a variety of different sources. For example, a cable 128 may form a wired connection with the communication and power ports 114 of the computing device 102, such as to receive one or more amps of current from the configurations described above.

In another example, a dedicated external power source 130 is used (e.g., a "power brick") that is connected to a wall outlet to get power. Thus, in this example a battery 124 of the mobile client device 104 may be charged by placing the device proximal to (e.g., resting on a surface of) the wireless charging mat 106 to form an inductive coupling. In one or more implementations, the wireless charging mat 106 also includes a battery disposed within the substrate 126 having a size that is suitable to charge the battery 124 of the mobile client device 104, e.g., through inductive charging and/or use of the cable 128.

The charging and communication coils 120, 122, may also support data communications. For example, an input device module 132 may allow the mobile client device 104 to act as a cursor control device for the computing device 102.

The input device module 132 may be configured to output a user interface 134 on a display device of the mobile client device 104, via which a user may control movement of a cursor and selection inputs (e.g., "clicks") in a manner similar to a trackpad. This data may then be communicated to the operating system 116 and/or applications 118 to support user interaction.

In another instance, the input device module 132 may facilitate the detection of movement of the mobile client device 104 as a whole. A user, for instance, may grasp an external housing 136 of the mobile client device 104 and move the device (e.g., along a surface of the wireless charging mat 106 in two dimension space or up and down in three dimension space) and have that movement detected by the input device module 132 to control a cursor of the computing device 102.

The movement is detectable in a variety of ways, such as through internal sensors (e.g., inertial, gyroscopic, and so on), by leveraging a camera of the mobile client device 104 (e.g., to detect changes in a pattern of the surface of the wireless charging mat 106), through hardware from dedicated cursor control devices (e.g., image sensors), and so forth. In this way, the mobile client device 104 may be readily charged and used to replace a dedicated cursor control device, thereby reducing the number of devices managed by a user. The communication functionality may be leveraged to support a variety of other functionalities such as authentication of a user, which is described below.

Figure 2:
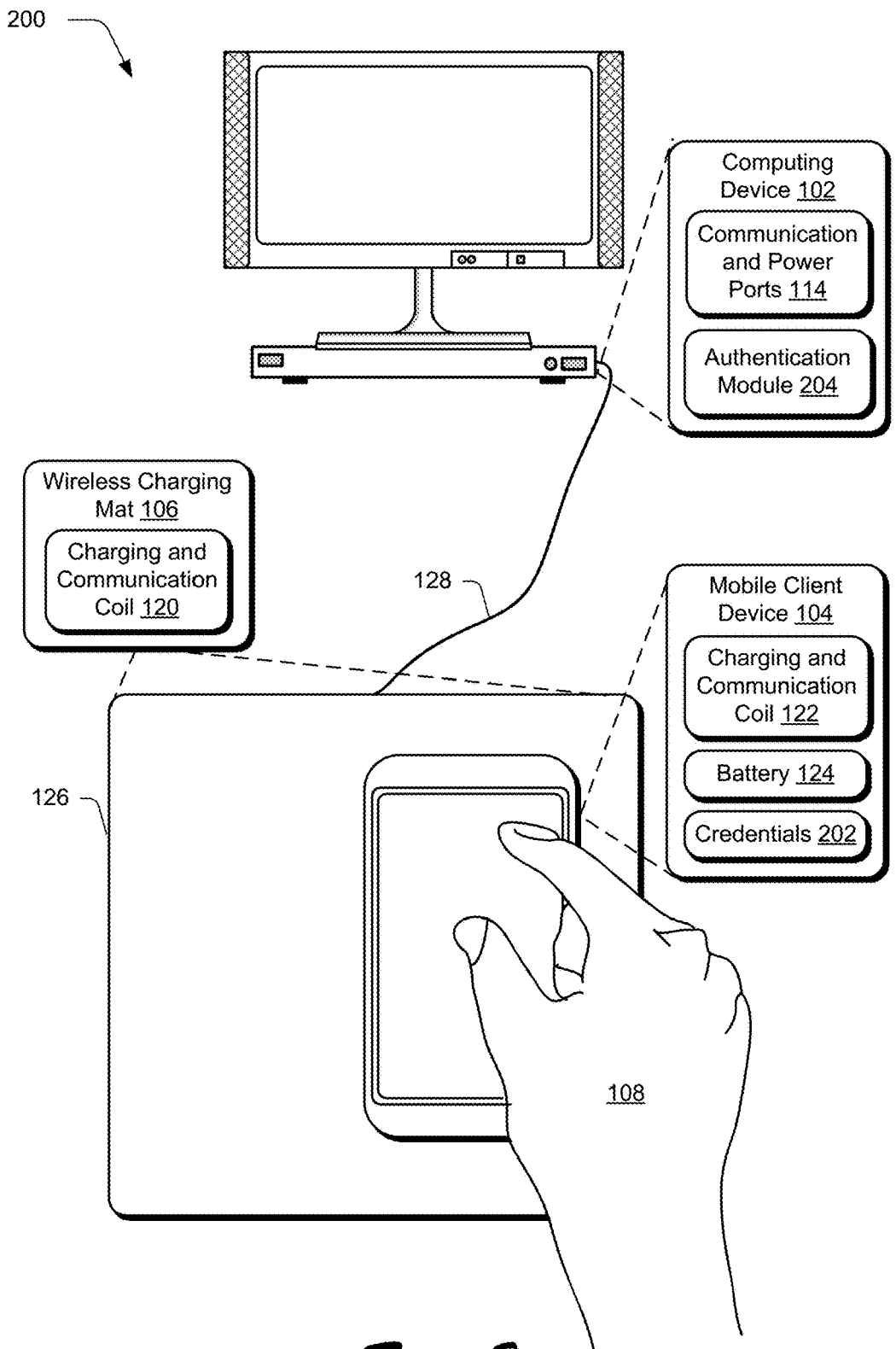
FIG. 2 depicts a system in an example implementation that includes a computing device, mobile client device, and wireless charging mat of FIG. 1 as employing authentication techniques implemented at least in part through communication supported by electromagnetic induction.

FIG. 2 depicts a system 200 in an example implementation that includes the computing device 102, mobile client device 104, and wireless charging mat 106 of FIG. 1 as employing authentication techniques implemented at least in part through communication supported by electromagnetic induction. Like the previous example, the charging and communication coils 120, 122 support communication between the wireless charging mat 106 and the mobile communication device 104. A cable 128 connected between the wireless charging mat 106 and the communication and power ports 114 of the computing device 102 supports communication between the wireless charging mat 106 and the computing device 102. In this way, the mobile client device 104 may communicate with the computing device 102 through use of the wireless charging mat 106 as an intermediary using electromagnetic induction, which may support a variety of functionalities.

In this example, the mobile client device 104 is illustrated as including credentials 202. The credentials 202 are communicated via the wireless charging mat 106 to an authentication module 204 on the computing device 102, thereby allowing a user to login to the computing device 102 via the mobile client device 104. This login may allow access to user settings, configurations, and applications that correspond to the user. In another example, the credentials 202 are used by the authentication module 204 to control access to a charging functionality of the wireless charging mat 106. In one configuration, only power sufficient for communication is initially provided by the wireless charging mat 106; after a successful login, the wireless charging mat 106 may provide a sufficient amount of power to charge the battery 124.

In one or more implementations, the wireless charging mat 106 is physically and communicatively coupled to the communication and power ports 114 of the computing device 102 to perform authentication, e.g., using the cable 128. Pairing of the wireless charging mat 106 with the computing device 102 is semi-permanent until a new pairing sequence is repeated. The pairing, for instance, may involve a password or verification of an ID to ensure that the pairing is legitimate. When the mobile client device 104 is placed on the substrate 126 of the wireless charging mat 106, the mobile client device 104 initiates the authentication process first with the wireless charging mat 106, and the wireless charging mat 106 then continues the authentication with the authentication module 204 of the computing device 102, thereby eliminating the requirement separately entering an ID or password to login to the computing device 102.

The credentials 202 may be input in a variety of ways. In one such example, the credentials 202 are input by a user to gain access to the mobile client device 104. Once entered, these credentials 202 are also leveraged to gain access to the computing device 102 at a later point in time without reentry of the credentials 202. In another example, the credentials 202 are input to the mobile client device 104 to specifically request access to the computing device 102. A variety of different types of credentials may be input, such as using unique shapes, passcodes, use of biometric scanners of the mobile client device 104 (e.g., thumbprint, facial recognition), and so forth. A variety of other examples are also contemplated without departing from the spirit and scope thereof.

Figure 3A:
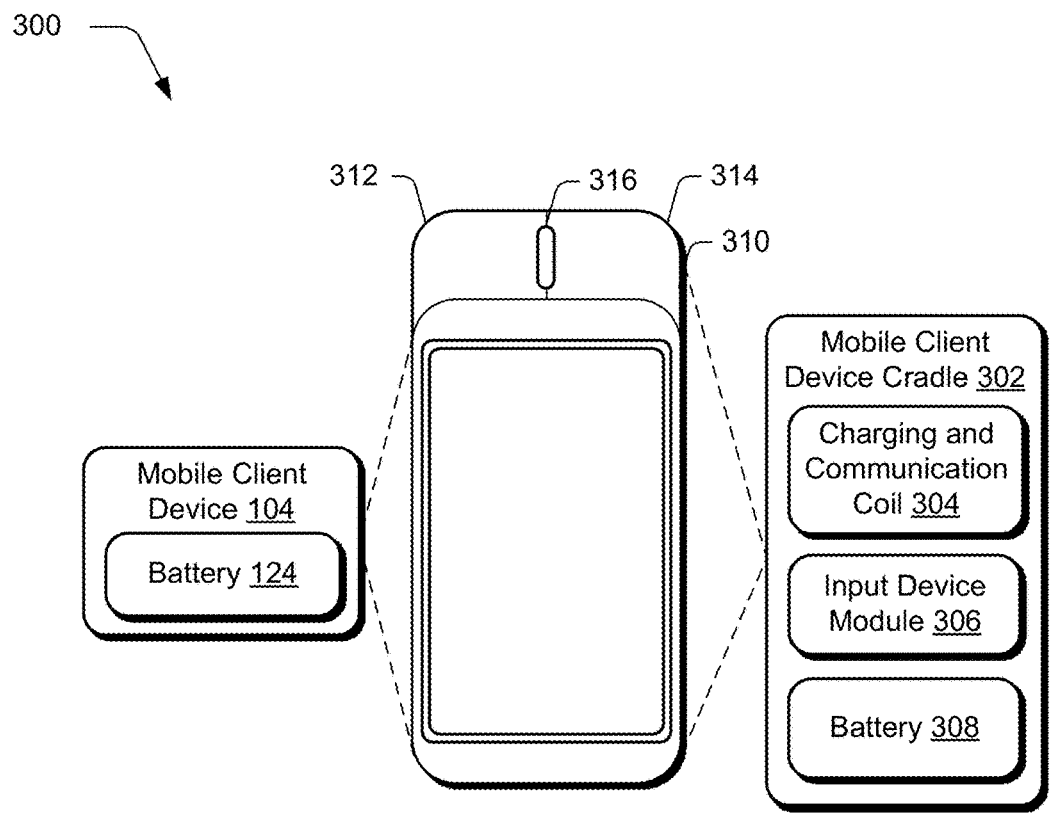
FIGS. 3A and 3B include a top view and a side view, respectively, of a mobile client device of FIG. 1 as employing a mobile client device cradle.
Figure 3B:
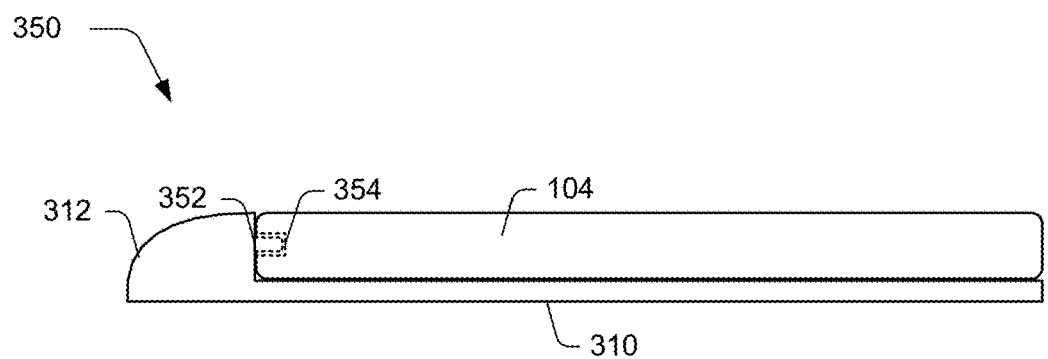

FIGS. 3A and 3B include a top view 300 and a side view 350, respectively of the mobile client device 104 of FIG. 1 as employing a mobile client device cradle 302. In the example of FIG. 1, the mobile client device 104 includes an input device module 132 that is usable to control a cursor of the computing device 102. The mobile client device 104 also includes a charging and communication coil 122 that is configured to support wireless charging and communication with the computing device 102 via the wireless charging mat 106.

In some instances, however, the mobile client device 104 may not include this functionality. Accordingly, in order to use the wireless charging, communication, and authentication techniques described herein, the mobile client device 104 may be attached to a mobile client device cradle 302. The mobile client device cradle 302 in this example includes a charging and communication coil 304 that is configured to support the communication, charging, and authentication techniques previously described. The mobile client device cradle 302 also includes an input device module 306 that is configured to permit the mobile client device cradle 302 to act as a cursor control device. A battery 308 is also included in this example that is usable to charge a battery 124 of the mobile client device 104 when electrically connected.

The mobile client device cradle 302, for instance, includes an external housing 310 that is configured to mimic a cursor control device, and thus in this example includes left and right buttons 312, 316 and a scroll strip 316. The input device module 306 is configured to detect two dimensional movement of the mobile client device cradle 302 as a whole (e.g., through image sensors) that is usable to control movement of a cursor.

The external housing 310 also includes a plug 352 illustrated in phantom in the side view 350 of FIG. 3B that is configured to form an electrical and communicative coupling with a communication and power port 354 of the mobile client device 104, e.g. a USB port. The mobile client device 104, for instance, may "snap in" to the external housing 310 of the mobile client device cradle 302 and thus avail itself of charging accomplished using the charging and communication coil 304 in relation to the wireless charging mat 106 of FIG. 1, authentication techniques, and so on. The wireless charging mat 106 may also be used to charge the battery 308 of the cradle and thus permit the mobile client device cradle 302 to charge the battery 124 of the mobile client device 104 even when an external power supply is not available for charging, e.g., not plugged in. Other examples of power sources for charging of a device are also contemplated, an example of which is described in the following and shown in a corresponding figure. Additionally, the cradle may also assume a variety of other configurations, such as to support a battery that is removable from a mobile phone for charging by the cradle and once charged is replaced back into the mobile phone.

Figure 4:
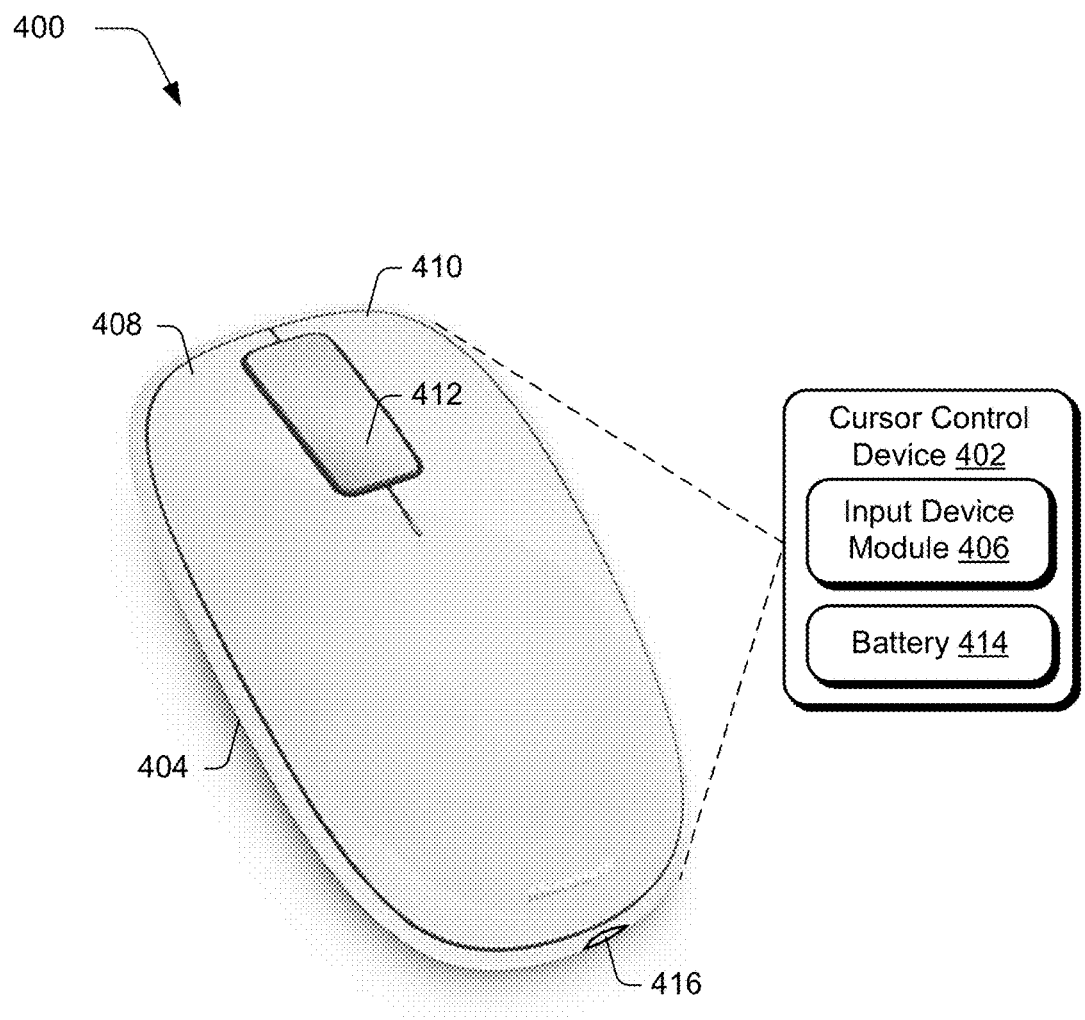
FIG. 4 depicts an example implementation of a cursor control device that is configured to act as an external power source to charge one or more devices.

FIG. 4 depicts an example implementation 400 of a cursor control device 402 that is configured to act as an external power source to charge one or more devices. The cursor control device 402 in this example includes an external housing 404 configured to be grasped by a hand of user in a manner of a traditional "mouse." An input device module 406 is included within the external housing 404 that includes user interaction control functionality as previously described. As such, the external housing 404 includes left and right buttons 408, 410 and a scroll sensor 412 that are usable to support user interaction with the computing device 102 of FIG. 1 to control movement of a cursor, provide selection inputs, and so on as part of the functionality of the input device module 406.

The cursor control device 402 is also illustrated as including a battery 414 and power port 416. The battery 414 is secured by the external housing and electrically connected to the power port 416 (e.g., a USB port, Thunderbolt®, Lightning®, or other port) to provide power to an external device, such as the mobile client device 104, peripheral devices, and so on through use of a cable, which may be formed as an integral part of the cursor control device 402.

The battery 414, for instance, may be disposed internally within the external housing 404 to take advantage of available space within the external housing 404 that conventionally is not utilized in order to support the handheld configuration, e.g., to have a sufficient size to be held. The battery 414 has a size that is sufficient to provide an amount of power to at least partially charge an external device, e.g., at least 2000 mA. The battery 414 may be charged in a variety of ways, such as through use of the power port 416, a charging and communication coil 304, and so on. Examples are also contemplated in which the battery 414 is removable, e.g., to be swapped with a removable battery of the mobile client device 104.

Thus, the cursor control device 402 may also avail itself of the wireless charging, communication, and authentication techniques previously described. In this example, functionality of a cursor control device and an external power pack are combined into a single device, thereby reducing the number of devices managed by a user. Further discussion of these and other examples is contained in the following section.

Example Procedures

The following discussion describes mobile client device wireless charging, communication, and authentication techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to the figures described above.

Functionality, features, and concepts described in relation to the examples of FIGS. 1-4 may be employed in the context of the procedures described herein. Further, functionality, features, and concepts described in relation to different procedures below may be interchanged among the different procedures and are not limited to implementation in the context of an individual procedure. Moreover, blocks associated with different representative procedures and corresponding figures herein may be applied together and/or combined in different ways. Thus, individual functionality, features, and concepts described in relation to different example environments, devices, components, and procedures herein may be used in any suitable combinations and are not limited to the particular combinations represented by the enumerated examples.

Figure 5:
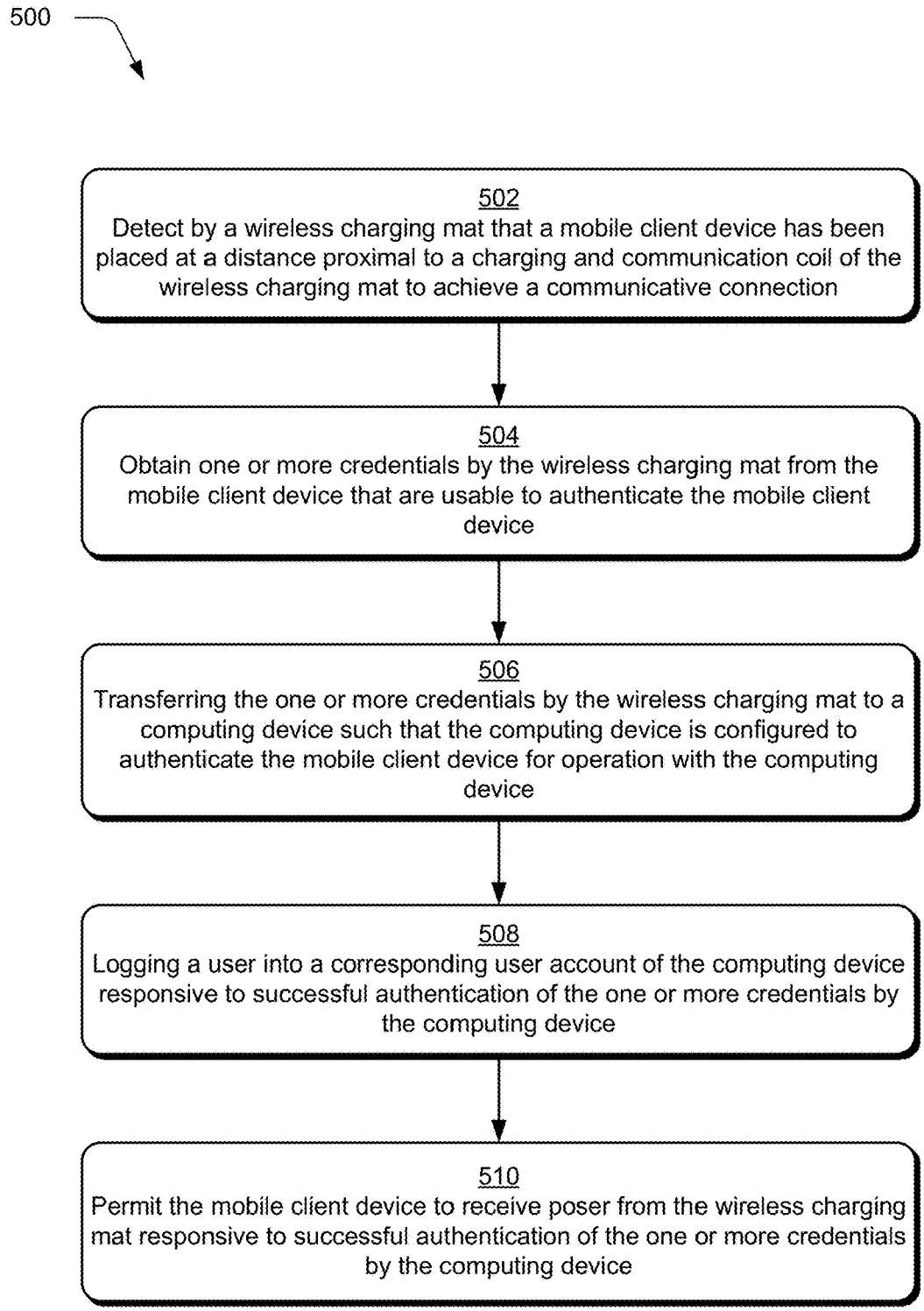
FIG. 5 is a flow diagram depicting a procedure in an example implementation in which authentication techniques are performed that leverage a wireless electromagnetic inductive connection.

FIG. 5 depicts a procedure 500 in an example implementation in which authentication techniques are performed that leverage a wireless electromagnetic inductive connection. A detection is made by a wireless charging mat 106 that a mobile client device 104 has been placed at a distance proximal to a charging and communication coil 120 of the wireless charging mat 106 to achieve a communicative connection (block 502). The wireless charging mat 106, for instance, may detect that the charging and communication coil 122 of the mobile client device 104 is close enough to the charging and communication coil 120 of the wireless charging mat 106 to communicate and/or receive power.

One or more credentials are obtained by the wireless charging mat 106 from the mobile client device 104 that are usable to authenticate the mobile client device 104 and responsive to the obtaining (block 504). The wireless charging mat 106 receives credentials 202 from the mobile client device 104 via the electromagnetic inductive connection.

The one or more credentials are transferred by the wireless charging mat 106 to the computing device 102 such that the computing device 102 is configured to authenticate the mobile client device 104 for operation with the computing device 102 (block 506). The wireless charging mat 106, for instance, may communicate the credentials 202 via a cable 128 connected to the communication and power ports 114 for authentication by the authentication module 204.

In an example, a user is logged into a corresponding user account of the computing device 102 responsive to successful authentication of the one or more credentials by the computing device 102 (block 508). In this way, the mobile client device 104 may be used to login a user without requiring the user to manually interact with the computing device 102 directly to perform the authentication.

In another example, the mobile client device 104 is permitted to receive power from the wireless charging mat 106 responsive to successful authentication of the one or more credentials by the computing device 102 (block 510). In this way, unauthorized devices are not permitted to receive power. A variety of other examples are also contemplated.

Example System and Device

Figure 6:
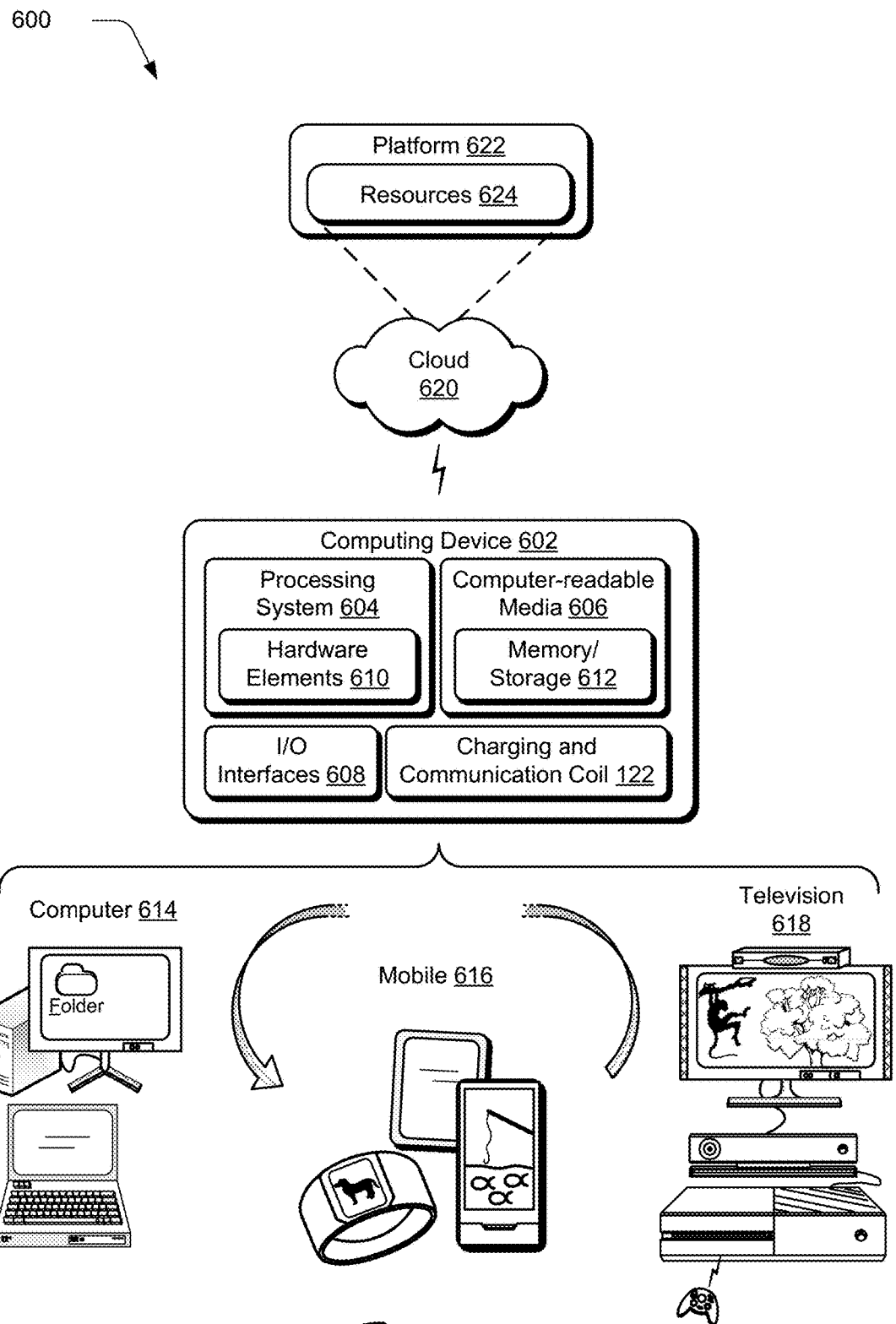
FIG. 6 illustrates an example system including various components of an example device that can be implemented as any type of computing device as described with reference to FIGS. 1-5 to implement embodiments of the techniques described herein.

FIG. 6 illustrates an example system generally at 600 that includes an example computing device 602 that is representative of one or more computing systems and/or devices that may implement the various techniques described herein (e.g., the mobile client device 104 and/or the computing device 102), as illustrated through inclusion of the charging and communication coil 122. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O interface 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware element 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 606 is illustrated as including memory/storage 612. The memory/storage 612 represents memory/storage capacity associated with one or more computer-readable media. The memory/storage component 612 may include volatile media (such as random access memory (RAM)) and/or nonvolatile media (such as read only memory (ROM), Flash memory, optical disks, magnetic disks, and so forth). The memory/storage component 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of a module that is executable by the computing device 602 as software may be achieved at least partially in hardware, e.g., through use of computer-readable storage media and/or hardware elements 610 of the processing system 604. The instructions and/or functions may be executable/operable by one or more articles of manufacture (for example, one or more computing devices 602 and/or processing systems 604) to implement techniques, modules, and examples described herein.

As further illustrated in FIG. 6, the example system 600 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 600, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 602 may assume a variety of different configurations, such as for computer 614, mobile 616, and television 618 uses. Each of these configurations includes devices that may have generally different constructs and capabilities, and thus the computing device 602 may be configured according to one or more of the different device classes. For instance, the computing device 602 may be implemented as the computer 614 class of a device that includes a personal computer, desktop computer, a multi-screen computer, laptop computer, netbook, and so on.

The computing device 602 may also be implemented as the mobile 616 class of device that includes mobile devices, such as a mobile phone, portable music player, portable gaming device, a tablet computer, a multi-screen computer, and so on. The computing device 602 may also be implemented as the television 618 class of device that includes devices having or connected to generally larger screens in casual viewing environments. These devices include televisions, set-top boxes, gaming consoles, and so on.

The techniques described herein may be supported by these various configurations of the computing device 602 and are not limited to the specific examples of the techniques described herein. This functionality may also be implemented all or in part through use of a distributed system, such as over a "cloud" 620 via a platform 622 as described below.

The cloud 620 includes and/or is representative of a platform 622 for resources 624. The platform 622 abstracts underlying functionality of hardware (e.g., servers) and software resources of the cloud 620. The resources 624 may include applications and/or data that can be utilized while computer processing is executed on servers that are remote from the computing device 602. Resources 624 can also include services provided over the Internet and/or through a subscriber network, such as a cellular or Wi-Fi network.

The platform 622 may abstract resources and functions to connect the computing device 602 with other computing devices. The platform 622 may also serve to abstract scaling of resources to provide a corresponding level of scale to encountered demand for the resources 624 that are implemented via the platform 622. Accordingly, in an interconnected device embodiment, implementation of functionality described herein may be distributed throughout the system 600. For example, the functionality may be implemented in part on the computing device 602 as well as via the platform 622 that abstracts the functionality of the cloud 620.

CONCLUSION AND EXAMPLE IMPLEMENTATIONS

Example implementations described herein include, but are not limited to, one or any combinations of one or more of the following examples:

Mobile client device wireless charging, communication, and authentication techniques are described. In one or more examples, a cursor control device includes an external housing configured to be grasped by a hand of a user and an input device module disposed within the housing configured to control movement of a cursor of a computing device that is communicatively coupled to the input device module. The cursor control device also includes one or more buttons accessible via the external housing that are configured to support user interaction to provide inputs to the computing device, a battery disposed within the external housing, and a power port disposed on the external housing and configured to charge an external device using power obtained from the battery disposed within the housing.

An example as described alone or in combination with any of the above or below examples, wherein the power port is configured in accordance with a Universal Serial Bus (USB).

An example as described alone or in combination with any of the above or below examples, wherein the input device module is configured to detect relative two dimensional movement in relation to a surface that is used to control the movement of the cursor.

An example as described alone or in combination with any of the above or below examples, wherein the battery is configured to store at least 2000 mAh.

An example as described alone or in combination with any of the above or below examples, wherein the battery is physically removable from the external housing.

An example as described alone or in combination with any of the above or below examples, wherein the physically removable battery, once removed, is configured to form a physical and electrical coupling through installation as part of a mobile phone.

An example as described alone or in combination with any of the above or below examples, further comprising an electromagnetic inductive coil disposed within the external housing that is configured to charge the battery using an external source.

An example as described alone or in combination with any of the above or below examples, wherein the input device module is further configured to communicate with the communication device over a wireless connection.

An example as described alone or in combination with any of the above or below examples, further comprising one or more cables formed as an integral part of the power port that are configured to directly connect to the external device.

An example as described alone or in combination with any of the above or below examples, wherein the external device is a mobile phone or tablet.

In one or more examples, an apparatus includes a substrate, at least one cable configured to obtain power from an external power source, and an electromagnetic inductive coil formed integrally as part of the substrate, the electromagnetic inductive coil configured to form a wireless coupling with an external device suitable to communicate with the external device and to charge a battery of the external device using the power obtained from the external power source.

An apparatus as described in claim 11, wherein the wireless coupling is configured to support communication between the external device and a computing device, to which, the at least cable is connected.

An example as described alone or in combination with any of the above or below examples, wherein the communication includes authentication of the external device with the computing device that is suitable to login a user to the computing device or authorize the external device to receive power.

An example as described alone or in combination with any of the above or below examples, further comprising a battery electrically coupled to the electromagnetic inductive coil and sized to provide power to the external device via the electromagnetic inductive coil in an amount sufficient to at least partially charge a battery of the external device.

An apparatus as described in claim 11, wherein the at least one cable is configured to also form a communicative coupling with the computing device and the external device is a mobile phone.

An example as described alone or in combination with any of the above or below examples, wherein the mobile phone is communicatively coupled to the computing device to act as a cursor control device to control a cursor of the computing device.

An example as described alone or in combination with any of the above or below examples, wherein the mobile phone is installed in a mobile client device cradle having a charging and communication coil configured to support the electrical connection with the electromagnetic inductive coil and includes an input device module configured to detect lateral movement that is used as a basis to control the cursor.

In one or more examples, a method includes detecting by a wireless charging mat that a mobile client device has been placed at a distance proximal to a charging and communication coil of the wireless charging mat to achieve a communicative connection. The method also includes obtaining one or more credentials by the wireless charging mat from the mobile client device that are usable to authenticate the mobile client device and responsive to the obtaining, transferring the one or more credentials by the wireless charging mat to the computing device such that the computing device is configured to authenticate the mobile client device for operation with the computing device.

An example as described alone or in combination with any of the above or below examples, further comprising logging a user into a corresponding user account of the computing device responsive to successful authentication of the one or more credentials by the computing device.

An example as described alone or in combination with any of the above or below examples, further comprising permitting the mobile client device to receive poser from the wireless charging mat responsive to successful authentication of the one or more credentials by the computing device.

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:

1. An apparatus comprising:
   a substrate;
   at least one cable configured to obtain power from a computing device usable as an external power source to power the apparatus; and
   an electromagnetic inductive coil formed integrally as part of the substrate, the electromagnetic inductive coil configured to form a wireless coupling with an external device, the wireless coupling of the electromagnetic inductive coil suitable to communicate with the external device and to charge a battery of the external device using the power obtained from the external power source, the wireless coupling configured to support communication between the external device and the computing device via the apparatus;
   wherein the wireless coupling formed between the electromagnetic inductive coil and the external device is configured to enable communication between the external device and the computing device such that the external device acts as a cursor control device to control a cursor of the computing device.

2. An apparatus as described in claim 1, wherein the communication includes authentication of the external device to the computing device, the authentication of the external device suitable to at least one of login a user to the computing device and authorize the external device to receive power.

3. An apparatus as described in claim 1, further comprising a battery electrically coupled to the electromagnetic inductive coil and sized to provide power to the external device via the electromagnetic inductive coil in an amount sufficient to at least partially charge a battery of the external device.

4. An apparatus as described in claim 1, wherein the at least one cable is configured to form a communicative coupling between the computing device and the apparatus, and wherein the external device is a mobile phone.

5. An apparatus as described in claim 4, wherein the mobile phone is installed in a mobile client device cradle having a charging and communication coil configured to support an electrical connection with the electromagnetic inductive coil of the apparatus, and wherein the mobile client device cradle includes an input device module configured to detect lateral movement that is used as a basis to control the cursor.

6. A method performed by a wireless charging mat comprising:
    detecting that a mobile client device has been placed at a distance proximal to a charging and communication coil of the wireless charging mat to achieve a communicative connection;
    obtaining, via the charging and communication coil, one or more credentials from the mobile client device that are usable to authenticate the mobile client device;
    responsive to the obtaining, transferring the one or more credentials to a computing device such that the computing device is configured to authenticate the mobile client device for operation with the computing device; and
    communicatively coupling the mobile client device to the computing device via the charging and communication coil to enable controlling movement of a cursor and selection inputs of the computing device via the mobile client device.

7. A method as described in claim 6, further comprising providing the one or more credentials to login a user into a corresponding user account of the computing device responsive to successful authentication of the one or more credentials by the computing device.

8. A method as described in claim 6, further comprising providing power to the mobile client device via the wireless charging mat responsive to successful authentication of the one or more credentials by the computing device.

9. A method as described in claim 6, wherein the wireless charging mat is communicatively coupled to the computing device via a cable, the cable being utilized for the transferring of the one or more credentials to the computing device.

10. An apparatus as described in claim 4, wherein the mobile phone is communicatively coupled to the computing device to output a user interface on a display of the mobile phone.

11. An apparatus comprising:
    a substrate;
    a charging and communication coil formed integrally as part of the substrate, the charging and communication coil configured to:
        detect that a mobile client device has been placed at a distance proximal to the charging and communication coil to achieve a communicative connection;
        obtain one or more credentials from the mobile client device that are usable to authenticate the mobile client device; and
        transfer the one or more credentials to a computing device to authenticate the mobile client device via the computing device for operation with the computing device;
    wherein the charging and communication coil is further configured to communicatively couple the mobile client device to the computing device to output a user interface on a display of the mobile client device through which movement of a cursor and selection inputs of the computing device can be controlled.

12. The apparatus of claim 11, wherein the charging and communication coil is an electromagnetic inductive coil.

13. The apparatus of claim 11, wherein the charging and communication coil is configured to obtain the one or more credentials via an electromagnetic inductive connection.

14. The apparatus of claim 11, further comprising one or more communication and power ports, wherein the apparatus is connected via at least one of the one or more communication and power ports to the computing device.

15. The apparatus of claim 14, wherein the at least one of the one or more communication and power ports is connected to the computing device via a cable.

16. The apparatus of claim 11, wherein the charging and communication coil is configured to create an alternating electromagnetic field that is transformed by a charging and communication coil of the mobile client device into an electrical current.

17. The apparatus of claim 11, wherein the charging and communication coil is further configured to provide the one or more credentials to login a user into a corresponding user account of the computing device responsive to successful authentication of the one or more credentials by the computing device.

18. The apparatus of claim 11, wherein the charging and communication coil is further configured to provide power to the mobile client device responsive to successful authentication of the one or more credentials by the computing device.

* * * * *